UNITED STATES PATENT OFFICE.

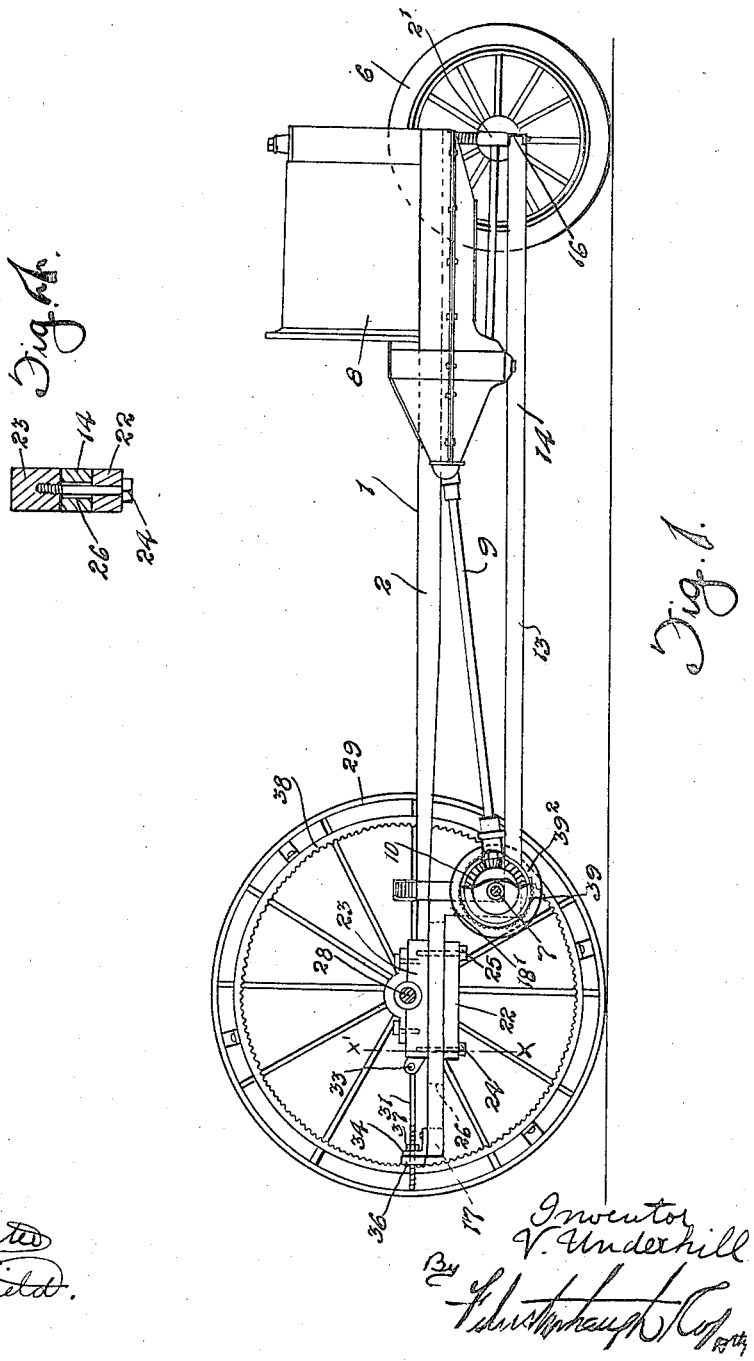

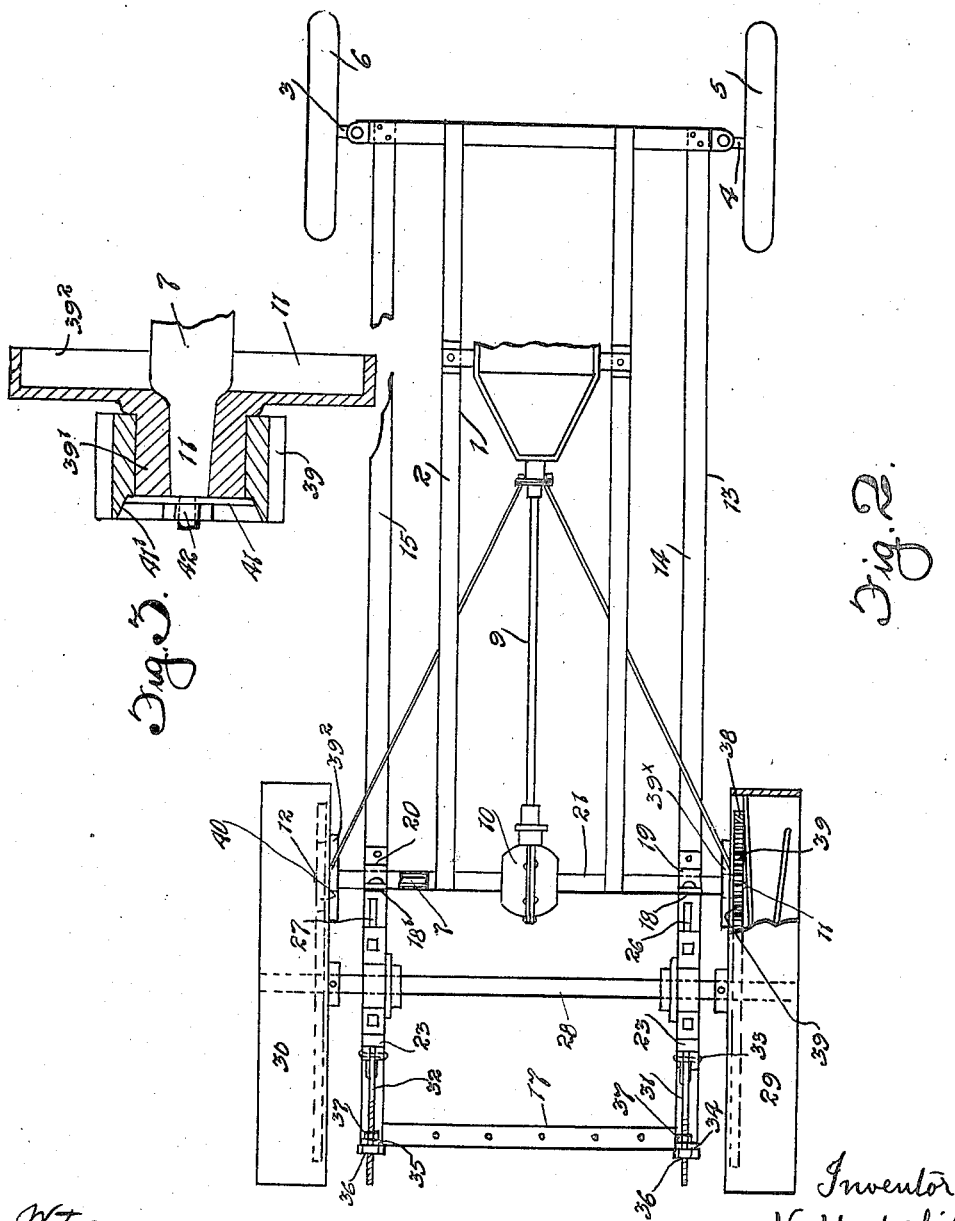

VICTOR UNDERHILL, OF RESTON, MANITOBA, CANADA.

TRACTOR-WHEEL ATTACHMENT FOR AUTOMOBILES.

1,302,103. Specification of Letters Patent. Patented Apr. 29, 1919.

Application filed April 17, 1917. Serial No. 162,666.

*To all whom it may concern:*

Be it known that I, VICTOR UNDERHILL, of the village of Reston, in the Province of Manitoba, Canada, have invented certain new and useful Improvements in Tractor-Wheel Attachments for Automobiles, of which the following is the specification.

The invention relates principally to an attachment for converting an automobile into a farm tractor and the principal object of the invention is to provide a simple, easily applied structure which can be readily attached to the present automobile chassis to convert the automobile chassis into a tractor and without requiring any change in the structure of the automobile chassis.

A further object of the invention is to construct the attachment so that various driving gears can be used, thereby allowing of a change speed drive.

A still further object is to provide parts which are for the greater part what might be termed stock material.

With the above principal and other minor objects in view, which will become more apparent as the description proceeds, the invention consists essentially in the arrangement and construction of parts hereinafter more particularly described and later pointed out in the appended claim, reference being had to the accompanying drawings in which:—

Figure 1 represents a side view of the complete appliance as applied on an automobile chassis.

Fig. 2 represents a plan view of same.

Fig. 3 represents an enlarged detailed vertical sectional view through one of the brake drums and associated parts.

Fig. 4 represents an enlarged detailed vertical sectional view through the rear part of the tractor frame, the section being taken in the plane denoted by the line X—X' Fig. 1.

In the drawings like characters of reference indicate corresponding parts in the several figures.

1 represents the customary automobile chassis embodying the frame 2, front pivot axles 3 and 4 with wheels 5 and 6, a rear axle 7, engine 8, transmission shaft 9, gear box or differential 10 and end spindles 11 and 12 at the end of the rear axle.

As stated, these parts are of ordinary construction and are actually embodied in their simplest form in the present well known chassis of the Ford car. While this car has been mentioned in particular, it is not to be considered that the invention is directed entirely to the conversion of this particular car as it could be adapted with equal facility to practically all types of automobiles. The Ford type has been herein selected as the application of my attachment is particularly simple and direct as applied to the Ford car and because the chassis of the Ford car is possibly one of the best known types and accordingly the description will be most easily understood on this account.

To the frame of the car chassis I secure an under tractor frame 13 which comprises side beams 14 and 15 connected forwardly by a cross beam 16 and rearwardly by a cross beam 17 and it will here be observed that this tractor frame extends rearwardly of the chassis. The front beam 16 is permanently fastened such as by bolting to the front cross member 2' of the automobile frame, while the side members 13 and 15 of the tractor frame are offset upwardly in a location adjoining the axle 7 and as indicated at 18 and 18' in which location they are fastened permanently such as by straps 19 and 20 to the bearing tubes 21 of the axle.

According to the above arrangement, it will be seen that the rearmost portion of the tractor frame forms an elevated extension located practically in the plane of the automobile frame.

22 and 23 are pairs of sliding blocks located on the top and bottom sides of the rear ends of the members 13 and 15 and 24 and 25 are bolts fastening the blocks together through the members, the bolts passing through lengthwise slots 26 and 27 provided in the members.

According to this arrangement it will be seen that the blocks can be moved endwise in respect to the members. The top blocks 23 provide bearings for a tractor shaft 28 which is fitted at its extremities with traction wheels 29 and 30 permanently fastened to the shaft. Means is provided for adjusting the blocks and consequently the tractor wheels, such means embodying in the present instance rearwardly extending threaded rods 31 and 32 attached at 33 to the top blocks and passing rearwardly through angle brackets 34 and 35 located at the extreme ends of the tractor frame. Lock nuts 36 and 37 are supplied on the rods at opposite sides of the brackets. Obviously by manipulating the lock nuts one can advance or recede the axle 28 as wished.

Each traction wheel is fitted with an internal gear wheel 38 for a purpose later disclosed, the gear in each instance being fastened permanently to the inner side of the wheel rim. In converting the chassis I remove the rear automobile wheels from their position on the spindles 11 and 12 and mount pinions 39 and 40 on the sleeves 39' of brake drums $39^2$ and $39^\times$ which I provide, the sleeves of the drums being arranged such that they slip on the end spindles of the axles after the wheels have been removed. The sleeves and gears are all held fixed to the axle so as to rotate with the same and this can be accomplished in any convenient way. In the drawing I have shown the fastening as made of a binding plate 41 for each spindle, the plate being mounted on the threaded contracted part of the axle and held jammed against the coned faces 41' of the gear by the action of a nut 42 applied on the axle. The pinions 39 and 40 mesh with the gears 38 of the traction wheels, thereby forming a drive between the automobile axle and the traction wheels. The brake drums $39^\times$ are provided to take the place of the usual automobile wheel drums and they are received within the brake band in the same manner so that the automobile brakes can be used with my appliance in the customary way.

The traction wheels have been made adjustable forwardly or backwardly of the tractor frame so that one can utilize various sizes of pinions and thereby vary the ratio of the gears and pinions.

From the above disclosure, it will be apparent that my tractor attachment, is a very simple one and can be applied to the automobile chassis without having to change the structure of the chassis. As the driving arrangement is so simple and direct it is not considered necessary to outline the manner in which the device works.

What I claim as my invention is:

The combination with an automobile chassis having the rear carriage wheels removed, of a tractor frame passing beneath the chassis and secured permanently thereto and having the rear end thereof formed with an upstanding offset providing a rearward elevated frame extension, sliding blocks mounted on the frame extension screw means for adjustment of the blocks toward and away from the chassis, a transverse traction shaft carried by the blocks, traction wheels mounted on the ends of the traction shaft, internal gear wheels secured to the traction wheels and pinions mounted to rotate with the rear axle of the chassis and engaging with the gears.

Signed at Winnipeg, this 26th day of March 1917.

VICTOR UNDERHILL.

In the presence of—
GERALD S. ROXBURGH,
ROLAND FOSTER.

Copies of this patent may be obtained for five cents each, by addressing the "Commissioner of Patents, Washington, D. C."